United States Patent

Klein et al.

[15] 3,689,573
[45] Sept. 5, 1972

[54] PROCESS FOR THE PREPARATION OF CYCLOPENT-2-ENYL PHENOLS

[72] Inventors: Alfons Klein, Duesseldorf; Karlfried Wedemeyer, Cologne-Stammheim, both of Germany

[73] Assignee: Farbenfabriken Bayer Aktiengesellschaft, Leverkusen, Germany

[22] Filed: July 11, 1969

[21] Appl. No.: 841,126

[30] Foreign Application Priority Data

July 15, 1968 Germany..........P 17 68 930.4

[52] U.S. Cl. ..........................260/621 R, 260/619 D
[51] Int. Cl. ..............................................C07c 37/14
[58] Field of Search .......................260/619 D, 621 R

[56] References Cited

UNITED STATES PATENTS

| | | |
|---|---|---|
| 3,075,832 | 1/1963 | Ecke et al. ..........260/619 D X |
| 2,864,868 | 12/1958 | Bader.................260/619 D X |
| 3,118,953 | 1/1964 | Cutukovic..........260/619 D X |
| 3,205,271 | 9/1965 | Ecke et al. .............260/619 D |
| 2,852,568 | 9/1958 | Schmerling........260/619 D X |
| 3,365,423 | 1/1968 | Sellers et al........260/619 D X |

Primary Examiner—Leon Zitver
Assistant Examiner—Norman Morgenstern
Attorney—Burgess, Dinklage & Sprung

[57] ABSTRACT

Reacting (optionally mono or di halo or alkyl -substituted) phenols, at least one ortho- or para- position to the hydroxy group of which is unsubstituted, with cyclopentadiene in the presence of an aluminum phenolate as catalyst, at a temperature of substantially between about 40°–120° C, to form in high yield and purity the corresponding known (optionally mono or di halo or alkyl -substituted)-ortho or para-cyclopent-2-enyl phenols, which are known intermediates usable for the synthesis of known insecticides.

17 Claims, No Drawings

PROCESS FOR THE PREPARATION OF CYCLOPENT-2-ENYL PHENOLS

The present invention relates to and has for its objects the provision for particular new methods of reacting (optionally mono or di halo or alkyl -substituted) phenols, at least one ortho- or para- position to the hydroxy group of which is unsubstituted, with cyclopentadiene in the presence of an aluminum phenolate as catalyst, at a temperature of substantially between about 40°–120° C, to form in high yield and purity the corresponding known (optionally mono or di halo or alkyl -substituted)-ortho or para-cyclopent-2-enyl phenols, which are known intermediates usable for the synthesis of known insecticides, e.g. in a simple reaction, using readily available starting materials and resulting in outstanding yields and purity, with other and further objects of the invention becoming apparent from a study of the within specification and accompanying examples.

It is known that cyclopent-2-enyl phenols can be prepared by reaction of phenols with cyclopentadiene in the presence of acid-treated bleaching earths (compare German Published Pat. No. 1,092,010). This process, however, exhibits a number of disadvantages. For instance, when operated on an industrial scale, corrosion problems arise because the activated bleaching earths are very acidic.

It is also known that in the case of reaction, in the presence of metal phenolates, of phenols with diolefins which contain a conjugated double bond, cyclic ethers are formed and not alkylphenols (compare German Published Pat. No. 1,164,425). Thus, from phenol and butadiene in the presence of metal phenolates, coumarans are formed, and from phenol and isoprene, chromans are formed, and in good yields in each case.

Finally, it is known that the appropriate cyclic ether is formed from 2-cyclopentenyl-phenol, by heating in acidic medium (compare J. Am. Chem. Soc. 75 (1953), page 6969).

It has now been found, in accordance with the present invention, that a versatile, simple and smooth process may be provided for the production in favorably high yields and high purity of cyclopent-2-enyl phenols of the general formula:

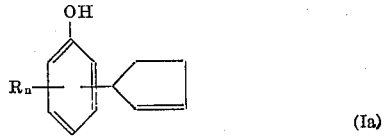
(Ia)

in which
the cyclopentenyl moiety is in one of: ortho and para position, i.e. other than meta position, with respect to the hydroxy group,
R is halo or alkyl of one to five carbon atoms, and
$n$ is a whole number from 0 to 2,
which comprises reacting a phenol of the formula:

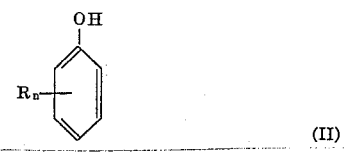
(II)

in which at least one of the ortho and para positions, i.e. other than a meta position, with respect to the hydroxy group is unsubstituted; and
R and $n$ are the same as defined above,
with cyclopentadiene (III) in the presence of an aluminum phenolate as catalyst at a temperature of from substantially between about 40° to 120° C, to form the corresponding cyclopent-2-enyl phenol.

Advantageously, the cyclopent-2-enyl phenols of formula (Ia) above can be obtained in particularly good yields according to the process of the present invention.

This is surprising, because in view of the prior art as discussed above it would have been expected that, in the reaction of phenols with cyclopentadiene in the presence of a metal phenolate, and specifically aluminum phenolate, cyclic ethers would be formed.

Compared with the previously known process for the preparation of cyclopentenyl phenols, i.e. using acid-treated bleaching earths, the process according to the present invention exhibits various distinct advantages. In this regard, no corrosion problems arise because no strongly acidic materials are used.

In accordance with the process of the present invention, the removal of the catalyst can be carried out much more simply than heretofore. Thus, after completion of the reaction, the aluminum phenolate is readily decomposed by addition of aqueous solution of sodium hydroxide. The sodium aluminate formed remains in the reaction mixture and conveniently creates an alkaline environment which is advantageous for the decomposition-free distillation of the desired cyclopentenyl phenols. Moreover, better yields are achieved in this manner.

Where phenol and cyclopentadiene are used as starting materials, the reaction course according to the process of the present invention can be represented by the following typical formula scheme:

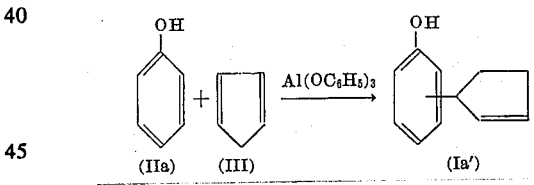

The cyclopent-2-enyl phenol of formula (Ia') so produced is usually a mixture of the 2- and 4-cyclopent-2-enyl phenol isomers.

Advantageously, in accordance with the present invention, in the various formulae herein:
R represents
halo such as chloro, bromo, fluoro and/or iodo, especially chloro, bromo and fluoro, and most especially chloro; or
straight and branched lower alkyl hydrocarbon, e.g. of one to five carbon atoms such as methyl, ethyl, n- and iso- propyl, n-, iso-, sec.- and tert.-butyl, n- and iso-amyl, and the like, especially $C_{1-4}$ or $C_{1-3}$ or $C_{1-2}$ alkyl; and
$n$ represents
a whole number from 0 to 2, especially 0–1;
such that $R_n$ taken together with the phenol ring moiety represents optionally mono or di halo or $C_{1-5}$ alkyl-substituted phenol ring moieties in which at least one ortho or para position to the hydroxy group is unsubstituted thereby in the starting phenol to provide the corresponding cyclopent-2-enyl substituent in ortho or para position to the hydroxy group in the final compound so-produced.

Preferably, R is chloro or $C_{1-2}$ alkyl and n is 0–1.

The starting phenols which are usable according to the process of the present invention are clearly characterized by formula (II) above.

Both cyclopentadiene and the phenols which may be used as starting materials are already known, as the artisan will appreciate.

The reaction can be carried out optionally in the presence of inert solvents (this term includes mere diluents). Suitable for this purpose are inert organic solvents, and mixtures thereof, in particular, aliphatic hydrocarbons, preferably lower, e.g. $C_{1-8}$, aliphatic hydrocarbons and especially lower alkyl hydrocarbons, such as hexane and/or heptane, and the like, and/or aromatic hydrocarbons, preferably benzene hydrocarbons, such as benzene, toluene and/or xylene, and the like.

As catalyst, aluminum phenolate is used. It is prepared according to known methods, for example by dissolving metallic aluminum in phenols or by reaction of phenols with aluminum trialkylene or aluminum alcoholates, as the artisan will appreciate.

The reaction of the present invention is carried out at temperatures of from substantially between about 40° to 120°C, preferably from between about 50° to 80°C.

In the reaction the molar ratio between the starting phenol and cyclopentadiene can be varied within a wide range. Thus, it is possible to use such starting phenol and the cylcopentadiene in an approximately equimolar ratio. Preferably, however, an excess of the starting phenol is used, e.g. 200 percent excess, since particularly high yields are then achieved. The aluminum phenolate can either be added as such to the reaction mixture or can be produced from the components in the reaction vessel.

The phenolate radical of the catalytically effective aluminum phenolate can be identical with that of the phenol to be reacted to form the desired cyclopentenyl phenol, but metal phenolates with other phenolate radicals may also be used. In this case, besides the produced cyclopentenyl derivative of the phenol which is reacted, there also are formed, to a lesser extent, corresponding cyclopentenyl derivatives of the phenol which is used in the form of the metal phenolate as catalyst.

Expediently, about 0.05 to 2.5 percent by weight, preferably 0.1 to 1.0 percent by weight, of aluminum phenolate, with reference to the phenol to be reacted, are used.

The reaction according to the present invention is expediently carried out in such a manner that first the phenol, optionally in the presence of a solvent, is heated with the necessary amount of aluminum until the aluminum phenolate has formed, which is discernible by the cessation of evolution of hydrogen. Thereafter, cyclopentadiene is immediately added dropwise at a temperature in the range of 40° to 120°C, preferably from 50° to 80°C. The reaction takes place at once. If a reaction is carried out in which the phenol component of the metal phenolate is not identical with the phenol to be reacted, it is advisable to first prepare the metal phenolate in the reaction vessel with as low as possible an excess of phenol, then to add the phenol to be reacted and, only thereafter, to initiate the reaction by the addition of cyclopentadiene.

The working up of the reaction product can take place in such a manner that the metal phenolate is decomposed with a dilute aqueous solution of sodium hydroxide. The aluminate thereby formed is left in the reaction mixture which is then subjected to a fractional vacuum distillation in order to isolate the desired products.

The instant process can also be carried out continuously by causing cyclopentadiene to act on the starting phenol in the presence of appropriate metal phenolates in suitable apparatus. For this process, it is expedient to prepare the aluminum phenolates beforehand and to react them together with the two reactants in the reaction vessel.

The cyclopent-2-enyl phenols obtained according to the process of the present invention are known intermediate products, as the artisan will appreciate, and are particularly suitable for the preparation of insecticides (compare British Pat. No. 920,462).

The following examples illustrate, without limitation, the process for producing the instant compounds according to the present invention.

EXAMPLE 1

1,410 g (15 mols) of phenol are dissolved in 1,000 ml xylene and dehydrated azeotropically for 4 hours. 1.8 g (0.067 mol) of aluminum metal granules are added to this solution at about 130° C and boiling under reflux is effected until a clear solution of aluminum phenolate has formed. Into this solution 330 g (5 mols) cyclopentadiene are introduced at 65° C within 2 hours and with stirring. After a further stirring period of 15 minutes, a solution of 9 ml of concentrated solution of sodium hydroxide in 50 ml of water is added. When the reaction mixture becomes cold, stirring is continued for 3 more hours.

In the ensuing distillation there are obtained, besides 1,030 g (=11 mols) of phenol, 581 g (approx.) 3.631 mols) of a mixture of 2- and 4- cyclopentenyl phenol of b.p. 110°–135° C/5 mm Hg. That corresponds to a yield of about 90 percent, with reference to reacted phenol. The residue consists of dicyclopentenyl phenols. The mixture of isomeric cyclopentenyl phenols, which contains 85 percent 2-cyclopentenyl phenol, can readily be separated by an efficient column distillation; 2-cyclopentenyl phenol boils at 118° C/5 mm Hg and 4-cyclopentenyl phenol at 133° C/5 mm Hg.

EXAMPLE 2

385.5 g (3 mols) 4-chlorophenol are dissolved in 400 ml xylene. After the addition of 0.36g (0.013 mol) aluminum granules as described in example 1, the mixture is reacted with 66 g (1 mol) cyclopentadiene at 65° C. After a further stirring period of 15 minutes, a solution of 3 ml of concentrated solution of sodium hydroxide in 15 ml of water is added and the stirring is continued for a further 3 hours.

In the ensuing distillation two fractions are obtained. The first fraction consists of 292 g (2.27 mols) 4-chlorophenol (starting product). The second fraction has the boiling point 150° C / 1 mm Hg and consists of 108.5 g (0.55 mol) of pure 4-chloro-2-cyclopentenylphenol. This corresponds to a yield of 76.5 percent with reference to the reacted 4-chlorophenol. The remaining product in the distillation flask consists mainly of 4-chloro-2,6-bis-cyclopentenyl-phenol.

EXAMPLE 3

324 g (3 mols) p-cresol are dissolved in 400 ml xylene. The mixture is reacted in the same manner as described in example 1, after the addition of 0.36 g (0.013 mol) aluminum granules, with 66 g (1 mol) cyclopentadiene at 65° C. After a stirring period of 15 minutes, a solution of 3 ml of concentrated solution of sodium hydroxide in 15 ml of water is added. The stirring is continued for a further 3 hours.

In the ensuing distillation two fractions are obtained. The first fraction consists of 252 g (2.23 mols) p-cresol (starting product). The second fraction has a boiling point of 135° C / 0.2 mm Hg and consists of 95 g (0.55 mol) pure 4-methyl-2-cyclopentenyl-phenol. This corresponds to a yield of 82 percent with reference to the reacted p-cresol. The remaining product in the distillation flask consists mainly of 4-methyl-2,6-bis-cyclopentenyl phenol.

What is claimed is:

1. Process for the production of cyclopent-2-enyl phenols of the formula

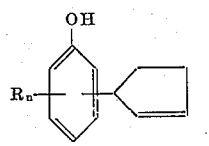

in which the cylopentenyl moiety is in one of the ortho and para positions with respect to the hydroxy group, R is selected from the group consisting of halo and alkyl of one to five carbon atoms, and $n$ is a whole number from 0 to 2, which comprises reacting a starting phenol of the formula

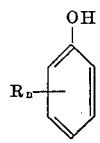

in which at cyclopentenyl one of the ortho and para positions with respect to the hydroxy group is unsubstituted, and R and n are the same as defined above, with cyclopentadiene in the presence of aluminum phenolate as catalyst at a temperature of substantially between 50° and 80° C, to form the corresponding cyclopent-2-enyl phenol, and then destroying the catalyst by addition of sodium hydroxide.

2. Process according to claim 1 wherein R is selected from the group consisting of chloro and $C_{1-2}$ alkyl, and $n$ is 0–1.

3. Process according to claim 1 wherein said aluminum phenolate is present in an amount of substantially between about 0.05 to 2.5 percent by weight based on the starting phenol.

4. Process according to claim 1 wherein said aluminum phenolate is present in an amount of substantially between about 0.1 to 1.0 percent by weight based on the starting phenol.

5. Process according to claim 1 wherein said process is carried out in the presence of an inert solvent.

6. Process according to claim 1 wherein said process is carried out in the presence of an inert solvent selected from the group consisting of aliphatic hydrocarbons, aromatic hydrocarbons, and mixtures thereof.

7. Process according to claim 1 wherein said process is carried out in the presence of an inert organic solvent selected from the group consisting of hexane, heptane, benzene, toluene, xylene and mixtures thereof.

8. Process according to claim 1 wherein said starting phenol and cyclopentadiene are used in an approximately equimolar ratio.

9. Process according to claim 1 wherein said starting phenol is used in molar excess with respect to the cyclopentadiene.

10. Process according to claim 1 wherein the phenolate radical of the aluminum phenolate used is the same as the corresponding phenol moiety of the starting phenol.

11. Process according to claim 1 wherein said aluminum phenolate is preformed in said starting phenol by heating the required amount of aluminum with said starting phenol, prior to the reaction with the cyclopentadiene.

12. Process according to claim 1 wherein said aluminum phenolate is decomposed with a dilute solution of sodium hydroxide, after completion of the reaction.

13. Process according to claim 12 wherein after decomposition of said aluminum phenolate by sufficient sodium hydroxide to render the mass alkaline, the resulting reaction mixture is subjected to fractional vacuum distillation to isolate the cyclopent-2-enyl phenol formed.

14. Process according to claim 1 wherein said process is carried out continuously.

15. Process according to claim 1 wherein said aluminum phenolate is present in an amount of substantially between about 0.05 to 2.5 percent by weight based on the starting phenol, said starting phenol is used in molar excess with respect to the cyclopentadiene, the phenolate radical of the aluminum phenolate used is the same as the corresponding phenol moiety of the starting phenol, said aluminum phenolate is decomposed after completion of the reaction by addition of a dilute aqueous solution of sodium hydroxide, and the resulting reaction mixture is subjected to vacuum distillation to isolate the cyclopent-2-enyl phenol formed.

16. Process according to claim 15 wherein the process is carried out in an inert organic solvent.

17. Process according to claim 15 wherein R is selected from the group consisting of chloro and $C_{1-2}$ alkyl, and $n$ is 0–1.

* * * * *

CERTIFICATE OF CORRECTION

Patent No. 3,689,573　　　　Dated September 5, 1972

Inventor(s) Alfons Klein et al

It is certified that error appears in the above-identified patent and that said Letters Patent are hereby corrected as shown below:

Col. 4, line 43 after "approx." delete " ) ".

Col. 5, line 48 omit "cyclopentenyl" and insert -- least --.

Signed and sealed this 15th day of May 1973.

(SEAL)
Attest:

EDWARD M. FLETCHER, JR.
Attesting Officer

ROBERT GOTTSCHALK
Commissioner of Patents